(12) United States Patent
Zhang et al.

(10) Patent No.: US 10,548,110 B2
(45) Date of Patent: Jan. 28, 2020

(54) PAGING FOR LOW COMPLEXITY USER EQUIPMENT AND/OR USER EQUIPMENT IN COVERAGE ENHANCEMENT MODE

(71) Applicant: NOKIA SOLUTIONS AND NETWORKS OY, Espoo (FI)

(72) Inventors: Yan Ji Zhang, Beijing (CN); Yuan Tao Zhang, Beijing (CN); Rapeepat Ratasuk, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/751,907

(22) PCT Filed: Aug. 12, 2015

(86) PCT No.: PCT/CN2015/086797
§ 371 (c)(1),
(2) Date: Feb. 12, 2018

(87) PCT Pub. No.: WO2017/024566
PCT Pub. Date: Feb. 16, 2017

(65) Prior Publication Data
US 2018/0249440 A1  Aug. 30, 2018

(51) Int. Cl.
*H04W 68/02* (2009.01)
*H04W 4/70* (2018.01)
*H04W 72/04* (2009.01)

(52) U.S. Cl.
CPC ............ *H04W 68/02* (2013.01); *H04W 4/70* (2018.02); *H04W 72/042* (2013.01)

(58) Field of Classification Search
CPC ..... H04W 68/02; H04W 72/042; H04W 4/70; H04W 76/45; H04W 72/04; H04W 72/12;
(Continued)

(56) References Cited

U.S. PATENT DOCUMENTS

| 2014/0098761 A1* | 4/2014 | Lee | H04W 74/006 370/329 |
|---|---|---|---|
| 2018/0007658 A1* | 1/2018 | Shen | H04W 68/02 |
| 2019/0069277 A1* | 2/2019 | Awad | H04L 5/0053 |

FOREIGN PATENT DOCUMENTS

| CN | 104137635 A | 11/2014 |
|---|---|---|
| CN | 104811279 A | 7/2015 |

(Continued)

OTHER PUBLICATIONS

International Search Report & Written Opinion dated May 13, 2016 corresponding to International Patent Application No. PCT/CN2015/086797.
(Continued)

*Primary Examiner* — Sharad Rampuria
(74) *Attorney, Agent, or Firm* — Squire Patton Boggs (US) LLP

(57) ABSTRACT

Systems, methods, apparatuses, and computer program products for paging of low complexity UE and/or UE in coverage enhancement mode are provided. One method includes producing a machine type communication (MTC) physical downlink control channel (M-PDCCH) configuration by configuring separate M-PDCCH subsets for paging. One of the subsets may be for low complexity user equipment, and another one of the subsets may be for user equipment operating in coverage enhancement mode.

13 Claims, 5 Drawing Sheets

(58) Field of Classification Search
CPC ... H04W 76/00; H04B 7/2121; H04B 7/2123; H04J 2203/0069; H04Q 2213/394
See application file for complete search history.

(56) References Cited

FOREIGN PATENT DOCUMENTS

WO    WO 2014/055878 A1    4/2014
WO    WO 2015/019182 A2    2/2015

OTHER PUBLICATIONS

Johan Bergman, "Further LTE Physical Layer Enhancements for MTC," 3GPP TSG RAN meeting #68, RP-150583, Jun. 18, 2015.
Ericsson, "Revised WI: Further LTE Physical Layer Enhancements for MTC," 3GPP TSG RAN Meeting #67, RP-150492, Shanghai, China, Mar. 9-12, 2015.
3GPP TS 36.304 V12.5.0 (Jun. 2015), Technical Specification, 3rd Generation Partnership Project; Technical Specification Group Radio Access Network; Evolved Universal Terrestrial Radio Access (E-UTRA); User Equipment (UE) procedures in idle mode (Release 12), 3GPP, Jun. 2015.
Partial Supplementary European Search Report dated Apr. 1, 2019 corresponding to European Patent Application No. 15900764.0.
Mediatek Inc: "Search space design for M-PDCCH," 3GPP Draft; R1-153319, 3GPP TSG RAN WG1 Meeting #81, Fukuoka, Japan, May 24, 2015, XP050973673.
Alcatel-Lucent et al.: "Considerations for M-PDCCH," 3GPP Draft; R1-152600, 3GPP TSG RAN WG1 Meeting #81, Fukuoka, Japan, May 24, 2015, XP050971051.
Communication pursuant to Rules 70(2) and 70a(2) EPC issued in corresponding European Patent Application No. 15900764.0, dated Jul. 23, 2019.
Extended European Search Report issued in corresponding European Patent Application No. 15900764.0, dated May 7, 2019.
Panasonic: "Common control messages for MTC UEs," 3GPP Draft; R1-152691, 3GPP TSG RAN WG1 Meeting #81, Fukuoka, Japan, May 15, 2015, XP050972851.

* cited by examiner

PAGING FOR LOW COMPLEXITY USER EQUIPMENT AND/OR USER EQUIPMENT IN COVERAGE ENHANCEMENT MODE

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to paging.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the enhanced Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A, introduced in LTE Rel-10, is carrier aggregation, which allows for increasing the data rates through aggregation of two or more LTE carriers, e.g., to the transmission bandwidth of up to 100 MHz. LTE-A in later releases may include even wider bandwidths as specified so far. Further, aggregating or interworking on the radio access level with the wireless LAN (WLAN) access network is foreseen.

SUMMARY

One embodiment is directed to a method, which may include configuring, by a network node, separate machine type communication (MTC) physical downlink control channel (M-PDCCH) subsets for paging. One of the subsets is for low complexity user equipment and another one of the subsets is for user equipment operating in coverage enhancement mode.

Another embodiment is directed to an apparatus that includes at least one processor and at least one memory comprising computer program code. The at least one memory and the computer program code are configured, with the at least one processor, to cause the apparatus at least to configure separate machine type communication (MTC) physical downlink control channel (M-PDCCH) subsets for paging. One of the subsets is for low complexity user equipment and another one of the subsets is for user equipment operating in coverage enhancement mode.

Another embodiment is directed to an apparatus that may include configuring means for configuring separate machine type communication (MTC) physical downlink control channel (M-PDCCH) subsets for paging. One of the subsets is for low complexity user equipment and another one of the subsets is for user equipment operating in coverage enhancement mode.

Another embodiment is directed to a method, which may include calculating, by a user equipment, a paging occasion/paging frame (PO/PF). The method may also include deriving a machine type communication (MTC) physical downlink control channel (M-PDCCH) configuration. The M-PDCCH configuration comprises a starting subframe and repetition period of the M-PDCCH transmission.

Another embodiment is directed to an apparatus that includes at least one processor and at least one memory comprising computer program code. The at least one memory and the computer program code are configured, with the at least one processor, to cause the apparatus at least to calculate a paging occasion/paging frame (PO/PF), and derive a machine type communication (MTC) physical downlink control channel (M-PDCCH) configuration. The M-PDCCH configuration comprises a starting subframe and repetition period of the M-PDCCH transmission.

Another embodiment is directed to an apparatus that may include calculating means for calculating a paging occasion/paging frame (PO/PF), and deriving means for deriving a machine type communication (MTC) physical downlink control channel (M-PDCCH) configuration. The M-PDCCH configuration comprises a starting subframe and repetition period of the M-PDCCH transmission.

Another embodiment is directed to a method, which may include calculating a paging occasion/paging frame (PO/PF) according to a new paging cycle definition that links the PO/PF with a machine type communication (MTC) physical downlink control channel (M-PDCCH) configuration, and deriving a machine type communication (MTC) physical downlink control channel (M-PDCCH) configuration. The M-PDCCH configuration comprises a starting subframe and repetition period of the M-PDCCH transmission.

Another embodiment is directed to an apparatus that includes at least one processor and at least one memory comprising computer program code. The at least one memory and the computer program code are configured, with the at least one processor, to cause the apparatus at least to calculate a paging occasion/paging frame (PO/PF) according to a new paging cycle definition that links the PO/PF with a machine type communication (MTC) physical downlink control channel (M-PDCCH) configuration, and to derive a machine type communication (MTC) physical downlink control channel (M-PDCCH) configuration. The M-PDCCH configuration comprises a starting subframe and repetition period of the M-PDCCH transmission.

Another embodiment is directed to an apparatus that may include calculating means for calculating a paging occasion/paging frame (PO/PF) according to a new paging cycle definition that links the PO/PF with a machine type communication (MTC) physical downlink control channel (M-PDCCH) configuration, and deriving means for deriving a machine type communication (MTC) physical downlink control channel (M-PDCCH) configuration. The M-PDCCH configuration comprises a starting subframe and repetition period of the M-PDCCH transmission.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for paging of low complexity UE and/or UE in coverage enhancement mode, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to paging. Paging may be used to notify user equipment (UE) in idle state about incoming data connections. It may be transmitted on the physical downlink shared channel (PDSCH) which is scheduled by the physical downlink control channel (PDCCH) over air interface. A UE in radio resource control (RRC) Idle mode uses discontinuous reception (DRX) to reduce power consumption, which determines how frequently the UE check for paging messages and wakes from specific paging occasion/paging frame (PO/PF) to monitor PDCCH for potential paging message.

3GPP Rel-13 includes a work item entitled "Further LTE Physical Layer Enhancements for MTC" [RP-150492]. The purpose of this work item is to specify a new low-complexity UE for machine type communications (MTC) operation in LTE, to support coverage enhancement (CE) for both Rel-13 low-complexity UE and UE operating in CE compared to existing LTE networks. RAN1 #81 agreed that the paging message is scheduled by MTC PDCCH (M-PDCCH) and a starting subframe of an M-PDCCH UE-specific search space is configured at least for enhanced coverage.

Figure 1:
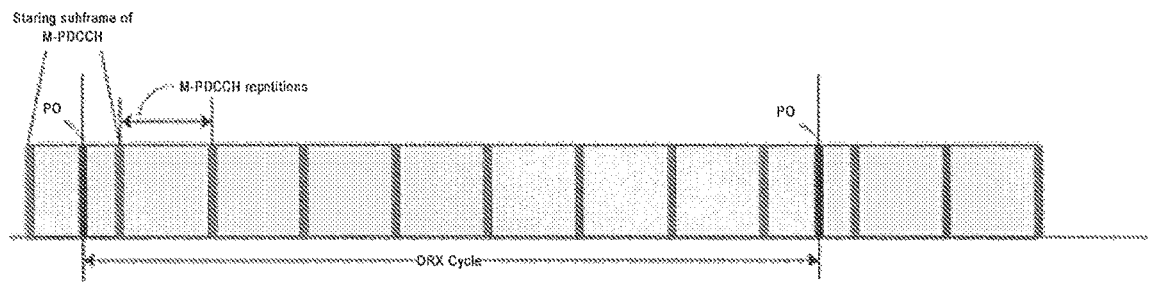
FIG. 1 illustrates an example M-PDCCH transmission and PO/PF, according to an embodiment.

More specifically, the work item looks at the issue whereby, for MTC, is the M-PDCCH has to be repeated numerous times depending on the specific coverage enhancement requirements of UEs. However, if there is a misalignment between the paging cycle and the M-PDCCH, the M-PDCCH may be incorrectly decoded. For example, such incorrect decoding may occur when the PO is not the starting subframe of the M-PDCCH transmission and the UE starts detecting M-PDCCH for paging from the PO which happens in the middle of the M-PDCCH repetitions. FIG. 1 illustrates an example M-PDCCH transmission and PO/PF, where the PO is not the starting subframe of the M-PDCCH transmission and the UE starts detecting M-PDCCH for paging from the PO. Therefore, it would be desirable to match the M-PDCCH and paging cycle setting to the extent possible.

Thus, embodiments of the invention aim to match the settings of both the paging cycle and the M-PDCCH. One embodiment is for the eNB to configure the M-PDCCH common search space for paging so that separate search subset spaces are formed: one for low complexity UEs, and one for enhanced mode UEs and broadcasted to all UEs in the cell.

Certain embodiments are directed to solutions for configuring the M-PDCCH common searching space for paging message and enhanced paging monitoring procedure for low complexity UEs and UEs in coverage enhancement mode.

The M-PDCCH common search space is made up of multiple search units from the beginning of each M-PDCCH repetition period. One search unit includes a group of subframes, the length of which is determined, for example, by the minimum of supported number of repetitions for transmitting an M-PDCCH downlink control information (DCI) for CE mode UEs.

Figure 2:
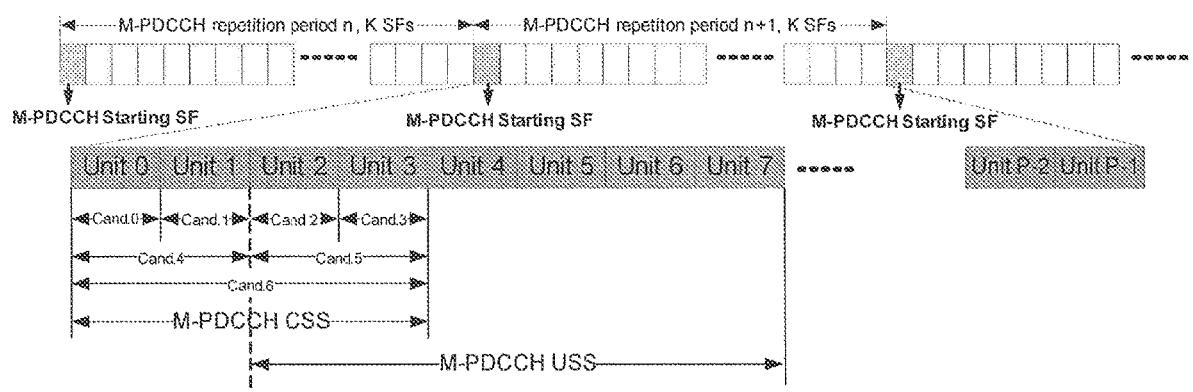
FIG. 2 illustrates a M-PDCCH common search space configuration, according to an embodiment.

The common search space and the UE specific search space can be overlapped in time domain. FIG. 2 illustrates a M-PDCCH common search space configuration, where M-PDCCH CSS is comprised of four search units. In the example of FIG. 2, four candidates (candidate 0-3) are defined with the same number of repetitions, with each mapped to one respective search unit. Candidates 4-6 are mapped to two or more search units respectively. That is to say, there are candidates mapped to different number of repetitions. The length of M-PDCCH CSS can be configured through broadcasting signaling.

In an embodiment, the eNB configures separate M-PDCCH subset {L,R} for paging, one {L,R} subset for low complexity UEs and another {L,R} subset for UE operating in coverage enhancement mode, where L is enhanced control channel element (eCCE) aggregation level and R is the number of repetitions. The eNB may also configure the starting subframe of a M-PDCCH UE-specific search space at least for UE in enhanced coverage. The M-PDCCH configuration may also be broadcast to UE via system information. In an embodiment, a subset may be considered to be equivalent to a UE search space (either UE-specific or common).

Therefore, according to certain embodiments, a subset may contain multiple {L,R} values that comprises the UE search space (e.g., {24,8}, {24,16}, {24,32}). As such, in this embodiment, a subset equals the UE search space.

Figure 3:
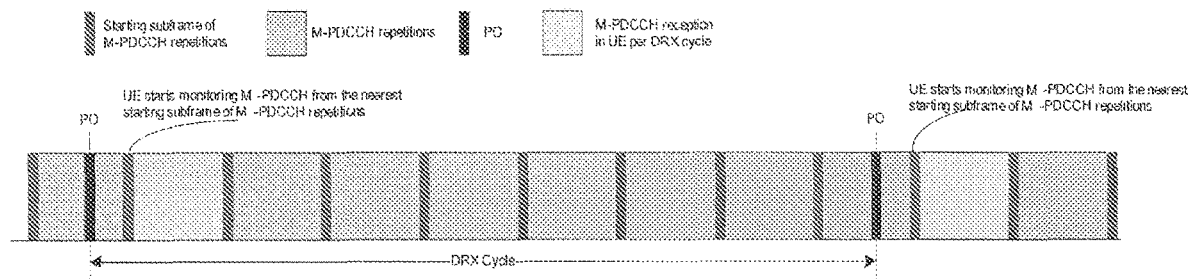
FIG. 3 illustrates an example M-PDCCH monitoring with paging cycle, according to an embodiment.

According to an embodiment, a UE starts monitoring M-PDCCH from the nearest configured M-PDCCH allocation (starting subframe of this M-PDCCH repetitions) after the calculated PO/PF. For example, in this embodiment, the UE may calculate the PO/PF with the existing equation specified in 3GPP TS 36.304, and derive the M-PDCCH configuration (starting subframe and the repetition number of the M-PDCCH transmission) from system information. Unlike existing paging monitoring procedure, in this embodiment, the UE wakes up from the nearest M-PDCCH configuration (starting subframe of this M-PDCCH repetition) after the calculated PO/PF. FIG. 3 illustrates an example M-PDCCH monitoring with paging cycle, according to this embodiment. It is noted that the M-PDCCH starting subframes may be different for different coverage enhancement levels and also for different UEs (e.g., to provide load balancing and reduce blocking probability).

In addition, a window containing multiple M-PDCCH decoding opportunities (i.e., {L, R} search spaces) in time may be defined. This can help reduce blocking probability but may require the UE to perform additional blind decodings which may increase power consumption. This window size may be configured by the eNB.

According to another embodiment, a new paging cycle definition is introduced by using one M-PDCCH repetition period as the minimum unit. One example is the paging cycle being: {32pr, 64pr, 128pr, 256pr}, where pr represents the M-PDCCH repetition period. The existing paging cycle range is {32rf, 64rf, 128rf, 256rf}, where value 32rf corresponds to 32 radio frames, 64rf corresponds to 64 radio frames, and so on. However, the repetition of M-PDCCH may occupy 10rf (100 subframes) in the worst case (i.e., the M-PDCCH may need to repeat more than 100 subframes in the worst case), so the paging cycle may need to be extended accordingly to guarantee the desired power saving.

Therefore, considering the repetition requirement of M-PDCCH, in this embodiment, a new parameter is introduced to count the bundle of M-PDCCH repetitions (or the repetition period of M-PDCCH). This new parameter may be named, for example, as MPN. However, other naming conventions may be used, and MPN is used herein as one example for the sake of simplicity. The MPN could be derived from the system frame number (SFN). For example, where each repetition period of M-PDCCH has M system frame(s) (M could be 2, 4, 8, 16), then MPN=SFN/M.

An embodiment extends the paging cycle to {32pr, 64pr, 128pr, 256pr}, where pr refers to the M-PDCCH repetition period, such that 32pr equals 32 M-PDCCH repetition periods and so on. The UE may then derive the M-PDCCH repetition period from the existing equation with following update: MPN mod T=(T div N)×(UE_ID mod N), where T is the DRX cycle duration in the number of M-PDCCH repetition period, N is given by Min(T, nB), nB belongs to the set {4T, 2T, T, T/2, T/4, T/8, T/16, T/32}, and UE_ID=IMSI mod(1024/M) (M is the duration of the repetition period of M-PDCCH, could be 2, 4, 8 . . . ). The paging occasion (PO) may be determined by the starting subframe of the M-PDCCH repetition period, and the UE starts receiving M-PDCCH for potential paging from this subframe.

Figure 4:
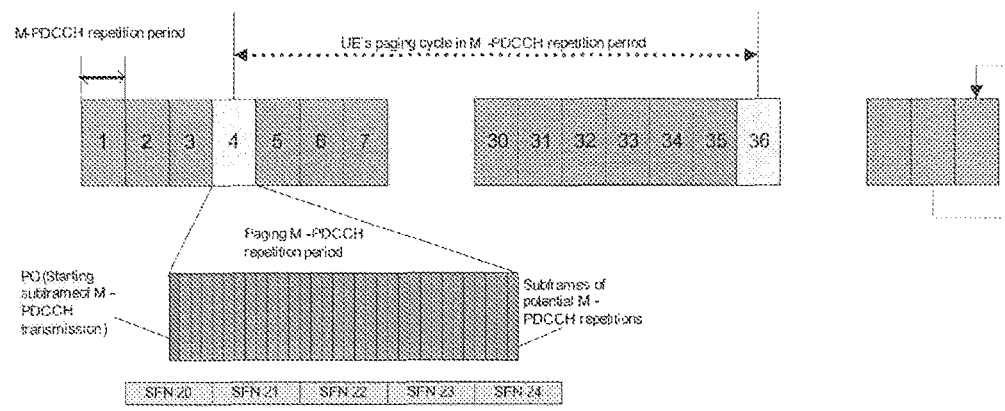
FIG. 4 illustrates an example of an enhanced paging cycle configuration, according to an embodiment.

FIG. 4 illustrates an example of an enhanced paging cycle configuration, where the paging cycle is configured as 32pr which means one paging cycle contains 32 M-PDCCH repetition periods and each modification period contains 4 system frames (which means M=4). The MPN of the M-PDCCH repetition period for monitoring paging is 4, 36, . . . , and the PO is the starting subframe within each M-PDCCH repetition period for paging. It is noted that the M-PDCCH repetition pattern is preconfigured and the starting subframe is not necessarily the subframe#0 of a system frame, in FIG. 4, the PO of MPN #4 is subframe #5 of SFN #20.

Figure 5A:
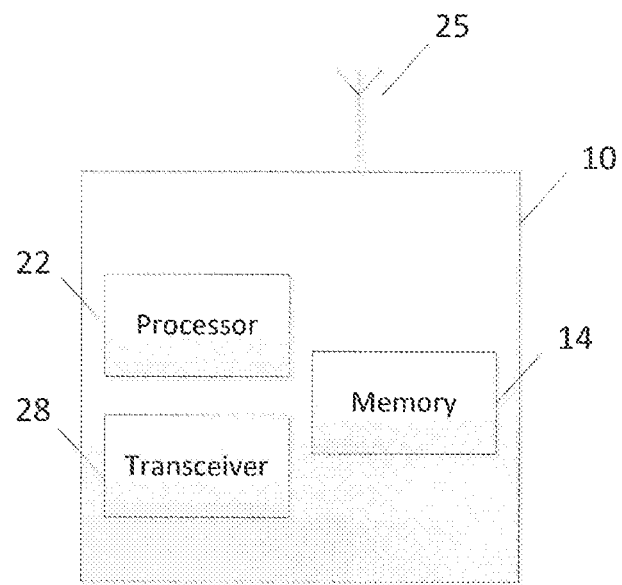
FIG. 5a illustrates a block diagram of an apparatus, according to an embodiment.

FIG. 5a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station in UMTS or eNB in LTE or LTE-A. However, in other embodiments, apparatus 10 may be other components within a radio access network. It should be noted that one of ordinary skill in the art would understand that apparatus 10 may include components or features not shown in FIG. 5a.

As illustrated in FIG. 5a, apparatus 10 includes a processor 22 for processing information and executing instructions or operations. Processor 22 may be any type of general or specific purpose processor. While a single processor 22 is shown in FIG. 5a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS or an eNB in LTE or LTE-A, for example. According to certain embodiments, apparatus 10 may be controlled by memory 14 and processor 22 to produce or generate a M-PDCCH configuration by configuring separate M-PDCCH subsets for paging. In an embodiment, one of the subsets is for low complexity user equipment and another one of the subsets is for user equipment operating in coverage enhancement mode.

According to one embodiment, each of the subsets may include an enhanced control channel element (eCCE) aggregation level and a number of repetitions. In some embodiments, apparatus 10 may be further controlled by memory 14 and processor 22 to broadcast the M-PDCCH configuration to UE(s) via system information. Also, in an embodiment, apparatus 10 may be further controlled by memory 14 and processor 22 to configure a starting subframe of the M-PDCCH UE-specific search space at least for UE(s) in enhanced coverage.

Figure 5B:
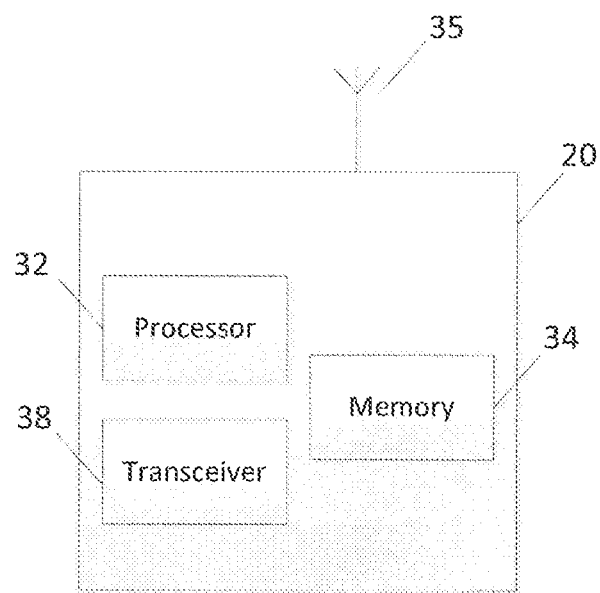
FIG. 5b illustrates a block diagram of an apparatus, according to another embodiment.

FIG. 5*b* illustrates an example of an apparatus 20 according to another embodiment. In an embodiment, apparatus 20 may be a node or element in a communications network or associated with such a network, such as a UE, mobile device, mobile unit, a machine type UE or other device. For instance, in some embodiments, apparatus 20 may be UE in LTE or LTE-A. It should be noted that one of ordinary skill in the art would understand that apparatus 20 may include components or features not shown in FIG. 5*b*.

As illustrated in FIG. 5*b*, apparatus 20 includes a processor 32 for processing information and executing instructions or operations. Processor 32 may be any type of general or specific purpose processor. While a single processor 32 is shown in FIG. 5*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In one embodiment, apparatus 20 may be controlled by memory 34 and processor 32 to calculate a paging occasion/paging frame (PO/PF) according to legacy equations (e.g., the equations defined in TS 36.304), and to derive a M-PDCCH configuration. The M-PDCCH configuration may include a starting subframe and repetition period of the M-PDCCH transmission.

In an embodiment, apparatus 20 may be controlled to derive the M-PDCCH configuration from system information. In some embodiments, apparatus 20 may also be controlled by memory 34 and processor 32 to wake up from nearest M-PDCCH configuration after the calculated paging occasion/paging frame (PO/PF).

According to another embodiment, apparatus 20 may be controlled by memory 34 and processor 32 to calculate PO/PF according to a new paging cycle definition that links the PO/PF with M-PDCCH configuration (that is, the DRX cycle is associated with the M-PDCCH period and the PO is actually the starting subframe within a M-PDCCH period). Apparatus 20 may be controlled, for example, to derive the M-PDCCH repetition period for potential paging according to the following formula: MPN mod T=(T div N)×(UE_ID mod N), where MPN is a parameter for counting the repetition period of M-PDCCH, T is the discontinuous reception cycle duration in the number of M-PDCCH repetition period, N is given by Min(T, nB), nB belongs to the set {4T, 2T, T, T/2, T/4, T/8, T/16, T/32}, and UE_ID=International Mobile Subscriber Identity (IMSI) mod(1024/M), and where M is a duration of the repetition period of M-PDCCH. In one embodiment, MPN=SFN/M, where SFN is system frame number and M is the number of system frames.

According to certain embodiments, apparatus 20 may be controlled by memory 34 and processor 32 to extend a paging cycle range. In one embodiment, the paging cycle may be extended to {32pr, 64pr, 128pr, 256pr}, where pr refers to the M-PDCCH repetition period.

According to certain embodiments, apparatus 20 may be controlled to determine the paging occasion (PO) by starting subframe of M-PDCCH repetition period. In an embodiment, apparatus 20 may then be controlled to start receiving M-PDCCH for potential paging from the starting subframe.

Figure 6A:
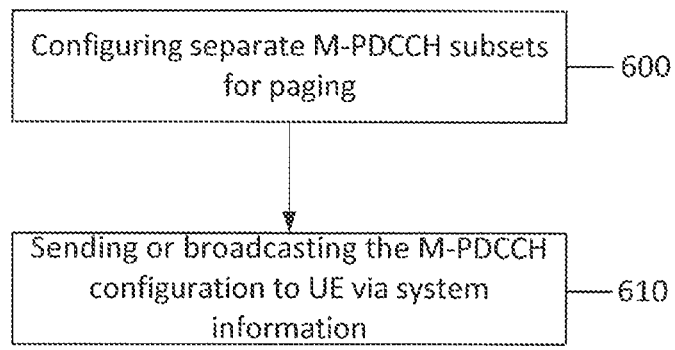
FIG. 6a illustrates a flow diagram of a method, according to one embodiment.

FIG. 6a illustrates an example flow diagram of a method for producing or generating a M-PDCCH configuration, according to one embodiment of the invention. In certain embodiments, the method of FIG. 6a may be performed by a network node, such as a base station or eNB. As illustrated in FIG. 6a, the method may include, at 600, configuring separate M-PDCCH subsets for paging. One of the subsets may be for low complexity user equipment and another one of the subsets may be for user equipment operating in coverage enhancement mode. According to some embodiments, each of the subsets may include an enhanced control channel element (eCCE) aggregation level and a number of repetitions. In an embodiment, the method may further include, at 610, sending or broadcasting the M-PDCCH configuration to UE via system information. In certain embodiments, the method may also include configuring a starting subframe of a M-PDCCH UE-specific search space at least for UE(s) in enhanced coverage.

Figure 6B:
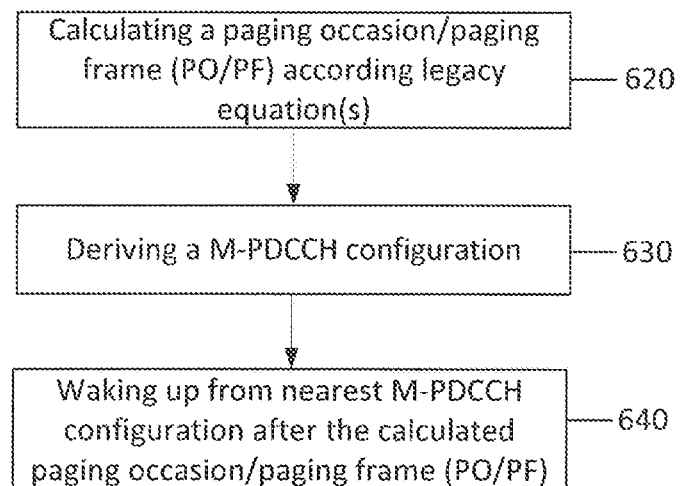
FIG. 6b illustrates a flow diagram of a method, according to another embodiment.

FIG. 6b illustrates an example flow diagram of a method for producing or generating a M-PDCCH configuration, according to one embodiment of the invention. In certain embodiments, the method of FIG. 6b may be performed by a device, such as a UE in LTE or LTE-A. As illustrated in FIG. 6b, the method may include, at 620, calculating a paging occasion/paging frame (PO/PF) according to the legacy PO/PF calculation (e.g., as defined in TS 36.304) and, at 630, deriving a M-PDCCH configuration. The M-PDCCH configuration may include a starting subframe and repetition period of the M-PDCCH transmission.

In certain embodiments, the deriving step may further include deriving the M-PDCCH configuration from system information. In an embodiment, the method of FIG. 6b may also include, at 640, waking up at the nearest M-PDCCH configuration after the calculated paging occasion/paging frame (PO/PF).

Figure 6C:
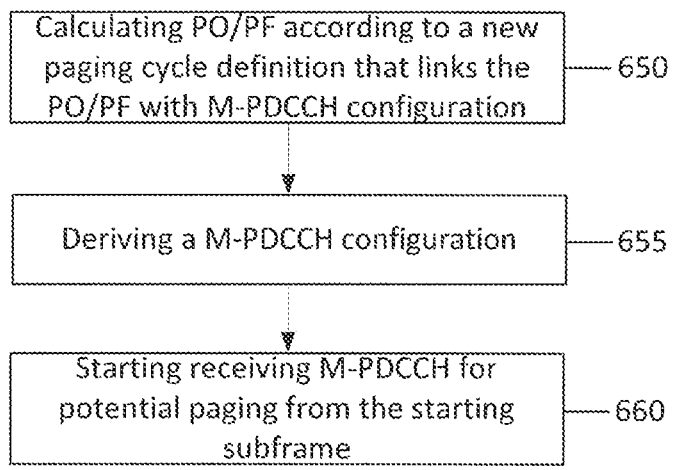
FIG. 6c illustrates a flow diagram of a method, according to another embodiment.

FIG. 6c illustrates an example flow diagram of a method, according to another embodiment. In certain embodiments, the method of FIG. 6c may be performed by a device, such as a UE in LTE or LTE-A. As illustrated in FIG. 6c, the method may include, at 650, calculating PO/PF according to a new paging cycle definition that links the PO/PF with M-PDCCH configuration and, at 655, deriving a machine type communication (MTC) physical downlink control channel (M-PDCCH) configuration. The M-PDCCH configuration may include a starting subframe and repetition period of the M-PDCCH transmission.

In this embodiment, the DRX cycle is associated with the M-PDCCH period and the PO is actually the starting subframe within a M-PDCCH period. In one example, the M-PDCCH repetition period for potential paging may be derived according to the following formula: MPN mod T=(T div N)×(UE_ID mod N), where MPN is a parameter for counting the repetition period of M-PDCCH, T is the discontinuous reception cycle duration in the number of M-PDCCH repetition period, N is given by Min(T, nB), nB belongs to the set {4T, 2T, T, T/2, T/4, T/8, T/16, T/32}, and UE_ID=International Mobile Subscriber Identity (IMSI) mod(1024/M), and where M is a duration of the repetition period of M-PDCCH. According to some embodiments, the MPN may be equal to SFN/M, where SFN is system frame number and M is the number of system frames.

According to an embodiment, the method of FIG. 6c may also include extending a paging cycle range. In one embodiment, the extending of the paging cycle range may include extending the paging cycle to {32pr, 64pr, 128pr, 256pr}, where pr refers to the M-PDCCH repetition period.

According to some embodiments, the calculating step may further include determining the paging occasion (PO) by starting subframe of M-PDCCH repetition period. The method may then include, at 660, starting receiving M-PDCCH for potential paging from the starting subframe.

Figure 7A:
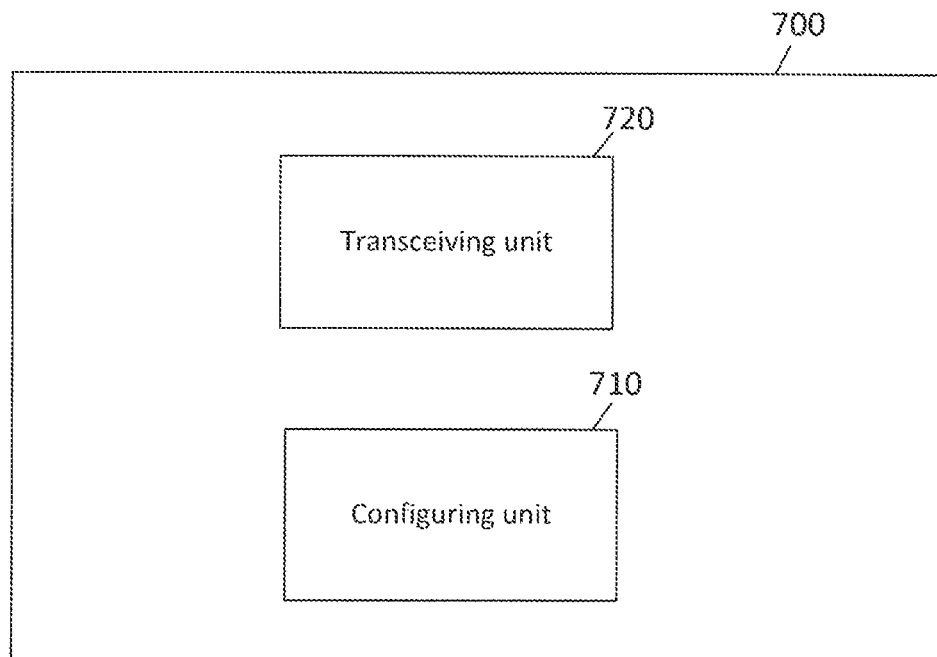
FIG. 7a illustrates a block diagram of an apparatus, according to one embodiment.

FIG. 7a illustrates an example block diagram of an apparatus 700, according to an embodiment. In certain embodiments, apparatus 700 may be a base station or eNB, for example. As illustrated in the example of FIG. 7a, apparatus 700 may include a configuring unit or means 710 and a transceiving unit or means 720 for receiving or transmitting information. In some embodiments, apparatus 700 may also include a storage unit or means, which is not shown.

According to an embodiment, configuring unit 710 may configure separate machine type communication (MTC) physical downlink control channel (M-PDCCH) subsets for paging. One of the subsets may be for low complexity UE and another one of the subsets may be for UE operating in coverage enhancement mode. Each of the subsets may include an enhanced control channel element (eCCE) aggregation level and a number of repetitions.

In an embodiment, transceiving unit 720 may send or broadcast M-PDCCH configuration to UE via system information. In some embodiments, configuring unit 710 may also configure a starting subframe of a M-PDCCH UE-specific search space at least for UE in enhanced coverage.

Figure 7B:
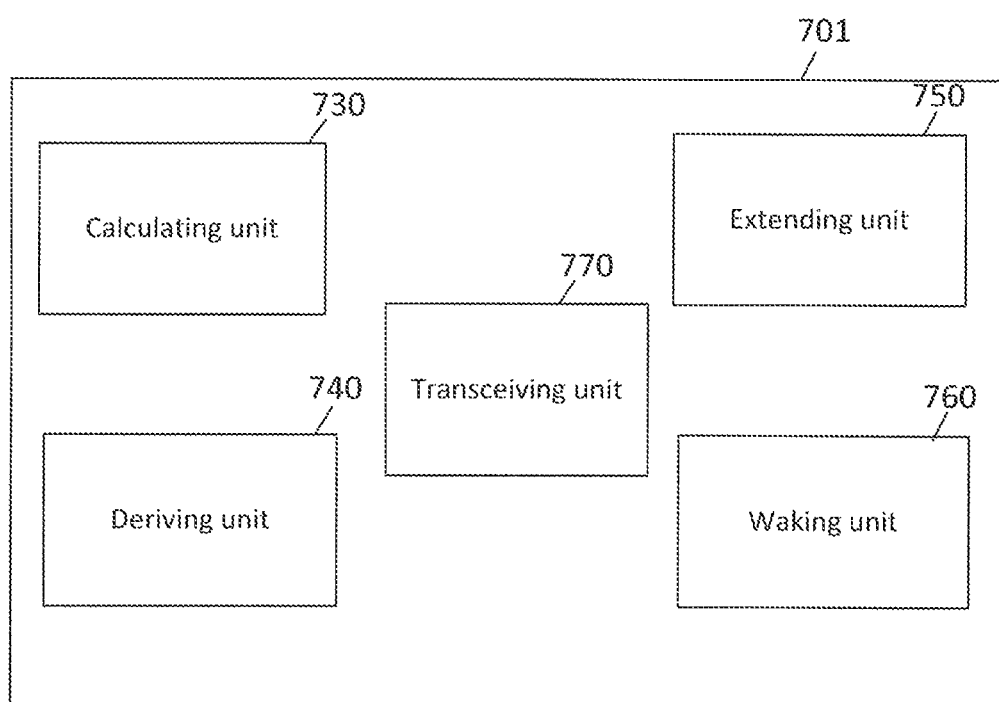
FIG. 7b illustrates a block diagram of an apparatus, according to another embodiment.

FIG. 7b illustrates an example block diagram of an apparatus 701, according to another embodiment. In certain embodiments, apparatus 701 may be a mobile device or UE, for example. As illustrated in the example of FIG. 7b, apparatus 701 may include a calculating unit or means 730, a deriving unit or means 740, an extending unit or means 750, a waking unit or means 760, and a transceiving unit or means 770 for receiving or transmitting information. In some embodiments, apparatus 701 may also include a storage unit or means, which is not shown.

According to an embodiment, calculating unit 730 may calculate a paging occasion/paging frame (PO/PF), for example, according to legacy equation(s), and deriving unit 740 may derive a M-PDCCH configuration. The M-PDCCH configuration may include a starting subframe and repetition period of the M-PDCCH transmission.

In one embodiment, deriving unit 740 may derive the M-PDCCH configuration from system information. According to some embodiments, waking unit 760 may wake up at the nearest M-PDCCH configuration after the calculated paging occasion/paging frame (PO/PF).

In another embodiment, calculating unit 730 may calculate a paging occasion/paging frame (PO/PF) according to a new paging cycle definition that links the PO/PF with M-PDCCH configuration, and deriving unit 740 may derive a M-PDCCH configuration. For example, in this embodiment, the DRX cycle is associated with the M-PDCCH period and the PO is actually the starting subframe within a M-PDCCH period. In this embodiment, deriving unit 740 may derive the M-PDCCH repetition period for potential paging according to the following formula: MPN mod T=(T div N)×(UE_ID mod N), where MPN is a parameter for counting the repetition period of M-PDCCH, T is the discontinuous reception cycle duration in the number of M-PDCCH repetition period, N is given by Min(T, nB), nB belongs to the set {4T, 2T, T, T/2, T/4, T/8, T/16, T/32}, and UE_ID=International Mobile Subscriber Identity (IMSI) mod(1024/M), and where M is a duration of the repetition period of M-PDCCH. In an embodiment, MPN may be equal to SFN/M, where SFN is system frame number and M is the number of system frames.

In certain embodiments, extending unit 750 may extend a paging cycle range. In one embodiment, the paging cycle may be extended to {32pr, 64pr, 128pr, 256pr}, where pr refers to the M-PDCCH repetition period. In one embodiment, calculating unit 730 may determine the paging occasion by starting subframe of M-PDCCH repetition period. Transceiving unit 770 may start receiving M-PDCCH for potential paging from the starting subframe.

In view of the above, embodiments of the invention may provide several advantages and technical improvements. For example, certain embodiments ensure the reliable M-PDCCH reception for detecting paging message for 3GPP Rel-13 low complexity UEs and UEs in coverage enhancement mode.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
configuring, by a network node, separate machine type communication physical downlink control channel subsets for paging,
wherein one of the subsets is for low complexity user equipment and another one of the subsets is for user equipment operating in coverage enhancement mode, and
wherein each of the subsets comprise enhanced control channel element aggregation level and a number of repetitions.

2. The method according to claim 1, further comprising broadcasting the machine type communication physical downlink control channel configuration to user equipment via system information.

3. The method according to claim 1, further comprising configuring a starting subframe of a machine type communication physical downlink control channel user equipment-specific search space at least for user equipment in enhanced coverage.

4. A method, comprising:
calculating, by a user equipment, a paging occasion/paging frame;

deriving a machine type communication physical downlink control channel configuration,
wherein the machine type communication physical downlink control channel configuration comprises at least one of a starting subframe or repetition period of the machine type communication physical downlink control channel transmission; and
monitoring at nearest machine type communication physical downlink control channel configuration after the calculated paging occasion/paging frame.

5. The method according to claim 4, wherein the deriving comprises deriving the machine type communication physical downlink control channel configuration from system information.

6. The method according to claim 4, wherein the deriving further comprises deriving the machine type communication physical downlink control channel repetition period for potential paging according to the following formula:

$$MPN \bmod T = (T \operatorname{div} N) \times (UE\_ID \bmod N),$$

where MPN is a parameter for counting the repetition period of machine type communication physical downlink control channel, T is the discontinuous reception cycle duration in the number of machine type communication physical downlink control channel repetition period, N is given by Min(T, nB), nB belongs to the set {4T, 2T, T, T/2, T/4, T/8, T/16, T/32}, and UE_ID=International Mobile Subscriber Identity (IMSI) mod(1024/M), where M is a duration of the repetition period of machine type communication physical downlink control channel.

7. The method according to claim 6, wherein MPN=SFN/M, where SFN is system frame number and M is the number of system frames contained in one repetition period of machine type communication physical downlink control channel.

8. The method according to claim 4, further comprising extending a paging cycle range.

9. An apparatus, comprising:
at least one processor; and
at least one memory comprising computer program code, the at least one memory and the computer program code are configured, with the at least one processor, to cause the apparatus at least to
calculate a paging occasion/paging frame;
derive a machine type communication physical downlink control channel configuration,
wherein the machine type communication physical downlink control channel configuration comprises at least one of a starting subframe or repetition period of the machine type communication physical downlink control channel transmission; and
monitor at nearest machine type communication physical downlink control channel configuration after the calculated paging occasion/paging frame.

10. The apparatus according to claim 9, wherein the deriving comprises deriving the machine type communication physical downlink control channel configuration from system information.

11. The apparatus according to claim 9, wherein the at least one memory and computer program code are further configured to cause the apparatus to derive the machine type communication physical downlink control channel repetition period for potential paging according to the following formula:

$$MPN \bmod T = (T \operatorname{div} N) \times (UE\_ID \bmod N),$$

where MPN is a parameter for counting the repetition period of machine type communication physical downlink control channel, T is the discontinuous reception cycle duration in the number of machine type communication physical downlink control channel repetition period, N is given by Min(T, nB), nB belongs to the set {4T, 2T, T, T/2, T/4, T/8, T/16, T/32}, and UE_ID=International Mobile Subscriber Identity (IMSI) mod(1024/M), where M is a duration of the repetition period of machine type communication physical downlink control channel.

12. An apparatus, comprising:
calculating means for calculating a paging occasion/paging frame; and
deriving means for deriving a machine type communication physical downlink control channel configuration,
wherein the machine type communication physical downlink control channel configuration comprises a starting subframe and repetition period of the machine type communication physical downlink control channel transmission; and
monitoring means for monitoring at nearest machine type communication physical downlink control channel configuration after the calculated paging occasion/paging frame.

13. A computer program embodied on a non-transitory computer readable medium, the computer program configured to control a processor to perform a process according to claim 1.

* * * * *